(No Model.)
R. A. BREUL.
CHAIN ATTACHMENT.
No. 450,807. Patented Apr. 21, 1891.
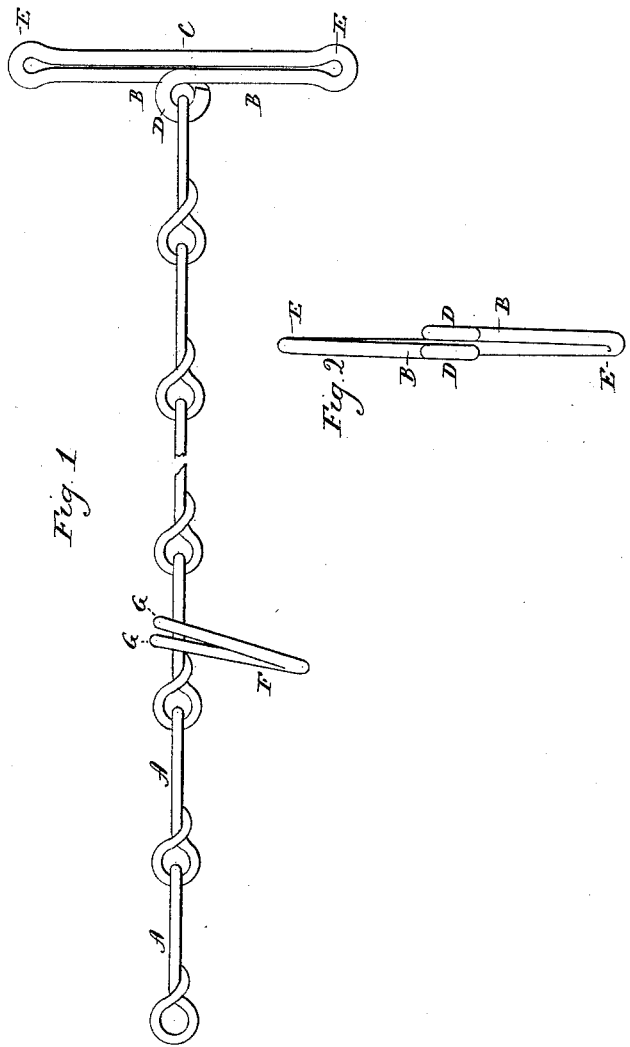

UNITED STATES PATENT OFFICE.

RICHARD A. BREUL, OF BRIDGEPORT, CONNECTICUT, ASSIGNOR TO THE BRIDGEPORT CHAIN COMPANY, OF SAME PLACE.

CHAIN ATTACHMENT.

SPECIFICATION forming part of Letters Patent No. 450,807, dated April 21, 1891.

Application filed August 15, 1890. Serial No. 362,100. (No model.)

*To all whom it may concern:*

Be it known that I, RICHARD A. BREUL, of Bridgeport, in the county of Fairfield and State of Connecticut, have invented new Improvements in Chain Attachments, (Case A;) and I do hereby declare the following, when taken in connection with the accompanying drawings and the letters of reference marked thereon, to be a full, clear, and exact description of the same, and which said drawings constitute part of this specification.

Figure 1 represents a broken view, in side elevation, of a chain representing the invention applied thereto to be used as a halter; Fig. 2, an edge view of the cross-bar, looking toward the eyes.

My invention relates to an improvement in attachments for chains, especially adapting them for halters or purposes where a cross-bar applied at some point in the chain is adapted to be engaged with a link of the chain or a ring applied thereto to produce a loop in the chain; and the invention consists in the construction, as hereinafter described and particularly recited in the claim.

The chain is composed of a series of links A. As here represented, each is made from a single piece of wire, the ends whereof are entwined at one of its ends. The particular form of the link is, however, immaterial, and constitutes no part of the present invention, the invention being applicable to chains having links of various constructions. The cross-bar is made from a single piece of wire of a length somewhat greater than twice the length of the bar required. Each end portion B B of the wire is doubled back upon the body or central portion C, and preferably so as to bring the parts close together, as shown, the bend at the ends being preferably made short, so as to produce an enlargement E at each end. The length of the end portions B B thus bent back upon the central portion or body of the wire is greater than one-half the length of the bar, so that the said ends when folded project one beyond the other, and the projecting portions are returned or bent in circular shape to form an eye D in each end of the said portions B B, the said two eyes D D standing in line with each other and side by side, as seen in Fig. 2, thus forming a double eye centrally on the bar. Through the eye thus formed a link of the chain is passed, uniting the bar to the chain. As here represented, the chain is provided with a ring F, attached thereto, with which the chain may be interlocked in the usual manner of interlocking cross-bars with a ring on the chain; or the bar may be interlocked with the link of the chain in any well-known manner.

I claim—

The herein-described attachment for chains, consisting of a cross-bar made from a single piece of wire, the end portions of the wire doubled back upon the central or body portion of the wire, the length of such doubled portions being greater than one-half the length of the wire, and so that the ends of the said doubled portions project beyond each other, the said end portions returned and each bent to form an eye, the said eyes standing side by side and adapted to receive a link of the chain, substantially as described.

In testimony whereof I have signed this specification in the presence of two subscribing witnesses.

RICHARD A. BREUL.

Witnesses:
 ROBERT M. CURTIS,
 McLAREN STEVENSON.